United States Patent
Ammann et al.

(10) Patent No.: US 12,202,087 B2
(45) Date of Patent: Jan. 21, 2025

(54) DEVICE FOR AUTOMATED PRODUCTION OF SCREW CONNECTIONS

(71) Applicant: Hella GmbH & Co. KGaA, Lippstadt (DE)

(72) Inventors: Daniel Ammann, Bielefeld (DE); Ingo Engler, Soest (DE); Ludger-Josef Gruene, Hoexter (DE); Frank Jagow, Erwitte/ Bad Westernkotten (DE); Miguel Lebrato-Rastrojo, Paderborn (DE); Matthias Mattenklotz, Geseke-Langeneicke (DE); Thomas Albert Roebbecke, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/322,818

(22) Filed: May 24, 2023

(65) Prior Publication Data
US 2023/0294224 A1   Sep. 21, 2023

Related U.S. Application Data

(63) Continuation of application No. PCT/EP2021/080486, filed on Nov. 3, 2021.

(30) Foreign Application Priority Data

Nov. 25, 2020 (DE) .......................... 102020131137.0

(51) Int. Cl.
*B23P 19/06* (2006.01)
*B25J 9/16* (2006.01)
(Continued)

(52) U.S. Cl.
CPC .......... *B23P 19/066* (2013.01); *B25J 9/1687* (2013.01); *B25J 13/085* (2013.01); *B25J 15/0616* (2013.01)

(58) Field of Classification Search
CPC ............................... B23P 19/06; F16H 1/2818
(Continued)

(56) References Cited

U.S. PATENT DOCUMENTS 4,249,431 A * 2/1981 Pruvot .................. F16H 1/2809
                                                                475/345
4,535,653 A * 8/1985 Coburn ...................... F16H 3/66
                                                                 81/58.3
(Continued)

FOREIGN PATENT DOCUMENTS

DE           3525208 A1    1/1986
DE     202014100334 U1    6/2015
(Continued)

*Primary Examiner* — Jason L Vaughan
(74) *Attorney, Agent, or Firm* — Husch Blackwell LLP

(57) ABSTRACT

A device is provided for the automated production of screw connections, and includes an articulated robot with an output element and an end link. The output element is arranged on the end link so as to be rotatable around an effector axis (wE). A screwdriver tool is provided, and can be rotated around the effector axis (wE) by the output element. At least one gear may also be provided, where the gear has a direct operative connection to the output element and the screwdriver tool and is set up for transmission of a rotary speed between the output element and the screwdriver tool.

7 Claims, 4 Drawing Sheets

(51) Int. Cl.
  *B25J 13/08* (2006.01)
  *B25J 15/06* (2006.01)
(58) Field of Classification Search
  USPC .......................................................... 901/41
  See application file for complete search history.

(56) References Cited

U.S. PATENT DOCUMENTS

| | | | | |
|---|---|---|---|---|
| 4,549,449 A | * | 10/1985 | Miller | F16H 3/54 |
| | | | | 475/303 |
| 4,627,310 A | * | 12/1986 | Coburn | B25B 17/02 |
| | | | | 81/58.3 |
| 4,690,010 A | * | 9/1987 | Matsumoto | B25J 9/126 |
| | | | | 475/179 |
| 4,781,519 A | * | 11/1988 | Monforte | B25J 15/04 |
| | | | | 414/730 |
| 4,869,139 A | * | 9/1989 | Gotman | B25B 21/008 |
| | | | | 475/263 |
| 5,104,024 A | * | 4/1992 | Brewer | B21J 15/34 |
| | | | | 901/41 |
| 10,265,837 B2 | * | 4/2019 | Lin | B25B 17/02 |
| 10,569,393 B2 | * | 2/2020 | Naoi | B25B 23/0078 |
| 2002/0098938 A1 | * | 7/2002 | Milbourne | F16H 3/64 |
| | | | | 475/286 |
| 2004/0052629 A1 | * | 3/2004 | Shibata | B23P 19/06 |
| | | | | 901/41 |
| 2014/0135987 A1 | * | 5/2014 | Maischberger | B25J 9/1694 |
| | | | | 700/258 |
| 2015/0148175 A1 | * | 5/2015 | Kierspe | B25F 5/001 |
| | | | | 475/269 |
| 2016/0082557 A1 | * | 3/2016 | Friz | B25B 23/0085 |
| | | | | 411/3 |
| 2017/0205798 A1 | * | 7/2017 | Ishii | B25J 11/005 |
| 2018/0021900 A1 | | 1/2018 | Huang et al. | |
| 2018/0029234 A1 | * | 2/2018 | Ueda | B25J 9/1633 |
| 2020/0039088 A1 | * | 2/2020 | Graul | B25J 15/0019 |
| 2021/0031341 A1 | * | 2/2021 | Chang | B25B 21/00 |
| 2021/0213574 A1 | * | 7/2021 | Robbecke | B25J 19/06 |
| 2022/0250197 A1 | * | 8/2022 | Martin | B25J 15/0019 |

FOREIGN PATENT DOCUMENTS

| | | |
|---|---|---|
| DE | 102015101920 A1 | 8/2016 |
| DE | 102020127488 A1 | 4/2022 |
| EP | 2729281 B1 | 5/2017 |

* cited by examiner

DEVICE FOR AUTOMATED PRODUCTION OF SCREW CONNECTIONS

CROSS REFERENCE

This application claims priority to PCT Application No. PCT/EP2021/080486, filed Nov. 3, 2021, which claims priority to German Application No. 10 2020 131137.0, filed Nov. 25, 2020, the entireties of both of which are hereby incorporated by reference.

FIELD OF THE INVENTION

The present invention relates to a device for the automated production of screw connections, comprising an articulated robot with an output element and an end link, where the output element is arranged on the end link so as to be rotatable around an effector axis, further comprising a screwdriver tool, which can be rotated around the effector axis by means of the output element.

BACKGROUND OF THE INVENTION

For the automated production of screw connection, articulated robots are usually equipped with an automated screwing unit. Such an automated screwing unit comprises the screwdriver tool and an associated drive with an electric motor. The current state of technology is aware of approaches in which the screwdriver tool is at least in part driven by the output element at the end link of the articulated robot.

For example, EP 2 729 281 B1 discloses a screwing device for joining by rotating and/or disconnecting by rotating in particular of screws with a robot with a rotary axis as an output, where the robot as effector bears an independently driven rotating device with a rotating tool, where the rotating device, where the rotating device is designed for rapid screwing in/unscrewing of the screw and where the rotary axis as an output of the robot is intended for tightening/loosening the screw. The entire rotating device is accommodated at the rotating output element of the robot and is consequently set rotating when subjected to rotary actuation by the robot-side rotary actuator, where a switchable blocking device ensures transmission of torque onto the rotating tool. This means a hybrid approach is proposed in EP 2 729 281 B1 in which the robot effects through rotation of its rotary axis as an output a loosening or tightening of the screw, whereas the rest of the screwing process is performed by the separate drive of the flange-mounted rotating device. In this context, the rotation angle of the robot-side output element is severely restricted, which constitutes a disadvantage, because coiling of the supply lines to the rotating device has to be prevented.

DE 20 2014 100 334 U1 discloses a robot tool with a frame and an integrated drive train for rotating an output part (in particular a screwdriver bit) of a rotary tool, where the drive train is designed for rotary actuation by a robot and features a torque amplifier connected to the output part for amplifying a torque of the robot. As an option, an additional motor drive train integrated into the robot tool can act on the output part also here. It is intended for the robot tool to be accommodated on an external, stationary guidance device, which constitutes a significant restriction regarding the flexibility of the entire device.

The subsequently published DE 10 2020 127 488 A1 discloses a device for the automated manufacture of screw connections, comprising an articulated robot and a screwdriver unit that can be rotated around an effector axis by an output element of an end link of the articulated robot, where the screwdriver unit comprises a screwdriver tool extending along the effector axis of the screwdriver tool. In this device, the output element at the end link of the articulated robot is used for endlessly rotating the screwdriver tool.

BRIEF SUMMARY OF THE INVENTION

The purpose of the present invention is to propose a refinement to a device for the automated production of screw connections, comprising an articulated robot with an output element and an end link, where the output element is arranged on the end link so as to be rotatable around an effector axle, further comprising a screwdriver tool, which can be rotated around the effector axle by means of the output element, which is suitable, in particular, for the efficient manufacture of screw connections in series production.

The invention includes the technical contribution that the device features at least one gear, where the gear has a direct operative connection to the output element and screwdriver tool and is set up to transmit a rotary speed between the output element and the screwdriver tool.

The invention is based on the idea of speeding up the screwing process that can be performed by the device by using an interposed gear to bring about an increase in the rotary speed of the screwdriver tool in comparison to the speed of the driving output element of the articulated robot.

As in DE 10 2020 127 488 A1, with the inventive device the output element at the end link of the articulated robot is used for the endless rotation of the screwdriver tool so that a further drive as is known from screwdriver tools from the current state of technology can be dispensed with. The output element is an integral part of the articulated robot so that a common articulated robot from the current state of technology can be used in the inventive device without further modifications. Of course, the end link of the articulated robot, which forms a housing of the output element and does not rotate along with it, is in principle able to move in six spatial axes and with sufficiently complex kinematics of the articulated robot to likewise perform a limited rotary movement around the effector axis, but not completely in the latter case. The invention provides for using the end link for accommodating all components that are not included in the rotation of the output element during the screwing process.

The screwdriver tool takes the form, for example, of a screwdriver blade or a bit holder with a screw bit.

As the output element of common articulated robots is not specifically intended for such a screwing process, the rotary speeds that can typically be achieved are lower than required for an optimum screwing process, i.e. one than can be performed in a short time. For this reason, with the inventive device at least one gear is arranged between the output element and the screwdriver tool, thus realizing a suitable transmission ratio, such as 1:3, which makes it possible to carry out a screwing process significantly more quickly. The gear can, for example, take the form of a spur gear.

In a preferential embodiment, the device features a planetary gear where the output element is connected to a drive link of the planetary gear in a driving manner and where an output link of the planetary gear is connected to the screwdriver tool in a driving manner. Planetary gears, also known as epicyclic gears, feature a compact design with aligning shafts for torque transmission, which is why they are extremely suitable for use in the inventive device. The output element of the articulated robot, drive and output link of the planetary gear and the screwdriver tool are all arranged in alignment along the effector axis and the torque for a screwing process is transmitted from the driving drive output element of the articulated robot through the planetary gear to the screwdriver tool.

Preferentially, the planetary gearing comprises a ring gear, a sun gear and a planetary carrier with planetary wheels, where the ring gear is connected to the end link of the articulated robot in a torque-proof manner and where the drive link of the planetary gear is formed by the planetary carrier and the output link by the sun gear. The planetary gear then runs in two-shaft operation in circular transmission, where the planetary carrier is driven by the output element of the articulated robot and the sun gear is connected in a torque-proof manner to the screwdriver tool. The ring gear can, for example, be fixed to a housing of the planetary gear, where the housing is accommodated rigidly at the end link of the articulated robot.

In a further embodiment, the inventive device features a plurality of planetary gears arranged in series, where a drive link of a first planetary gear is connected in a torque-proof manner to the output element and where an output link of a last planetary gear is connected in a torque-proof manner to the screwdriver tool. Such a series arrangement of planetary gears makes it possible to realize an especially small transmission ratio, where the term transmission ratio designates the quotient of the rotary speed of the output element of the articulated robot to the resulting rotary speed of the screwdriver tool.

In particular the planetary gears arranged in series can each comprise a ring gear, a sun gear and a planetary carrier with planetary wheels, where the ring gears are connected in a torque-proof manner to the end link and where the drive link of the first planetary gear is formed by its planetary carrier and the output link of the last planetary gear by its sun gear. The shafts of the planetary gear are arranged in alignment on the effector axis and the connection between adjacent planetary gears is in each case between the planetary carrier and the sun gear.

In a further embodiment, the at least one gear features an airtight housing with a suction connection, where the housing is connected in a torque-proof manner to the end link. Furthermore, the device features, for example, a suction pipe, which is accommodated on the housing in such a way that negative pressure can be applied to the housing and the suction pipe via the suction connection, where the screwdriver tool extends axially into the suction pipe, and where the suction pipe features an opening for airtight application of a screw. In doing so, the screw is subject to a holding effect and as part of an automated process the application of a screw to the screwdriver tool and transportation of the applied screw to the component to be screwed can be carried out in a secure and robust manner. Suction-based holding of screws is known in principle from the current state of technology but only with the design of the gear described here with an airtight housing and a suction connection is it possible to integrate this principle into the inventive device. This means the inventive use of the output element of the articulated robot for driving on its own the screwdriver tool in combination with a drive is not to the detriment of the degree of automation of the production of screw connections that can be performed with the device.

As an alternative to the embodiment with a suction pipe, the device can feature a suction channel which extends axially all the way through the screwdriver tool, where the screwdriver tool is accommodated on the gear in such a way that negative pressure can be applied to the housing and the suction channel via the suction connection in such a way that a screw can be caused to engage with and be held by the screwdriver tool by means of the negative pressure.

The articulated robot preferentially features six rotary axes, where the effector axis is formed by the sixth rotary axis, and where the end link can be rotated around the fifth rotary axis.

Furthermore, the device can advantageously feature a torque sensor and/or a force sensor interacting with the screwdriver tool. This makes it possible to check and document the screwing process. Typically, suitable torque or force sensors are already integrated into the articulated robot.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
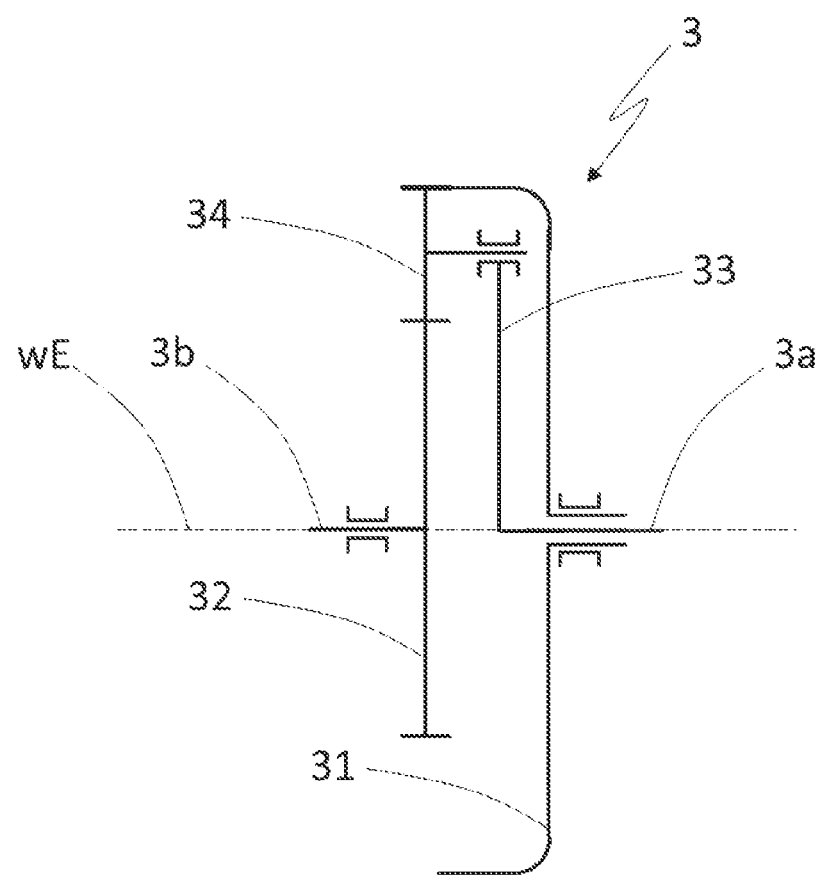
FIG. 1 is a schematic cross-section view of a planetary gear.

FIG. 1 shows a schematic cross-section view of a planetary gear 3 for use in an inventive device along whose effector axis wE the drive link 3a and the output link 3b of the planetary gear 3 are arranged in alignment. The planetary gear 3 comprises the ring gear 31, the sun gear 32 as well as the planetary carrier 33 with the planetary wheels 34. In the present case, only one of the planetary wheels 34 can be seen in the cross-section shown, where for example two further planetary wheels are accommodated on the planetary carrier 33 at a distances of 120° each. Alternatively, a planetary gear with two, four or further planetary wheels can be used. The planetary wheels 34 engage with both the ring gear 31 and the sun gear 32. In an inventive device, the ring gear 31 is held in place, i.e. connected in a torque-proof manner to the end link of the articulated robot, for example via a gearbox. The drive link 3a is formed by the planetary carrier 33 and the output link 3b by the sun gear 32. In an inventive device, the output element of the articulated robot is connected in a driving, i.e. in a torque-proof manner, to the drive link 3a and the output link 3b is connected in a driving manner to the screwdriver tool.

Figure 2:
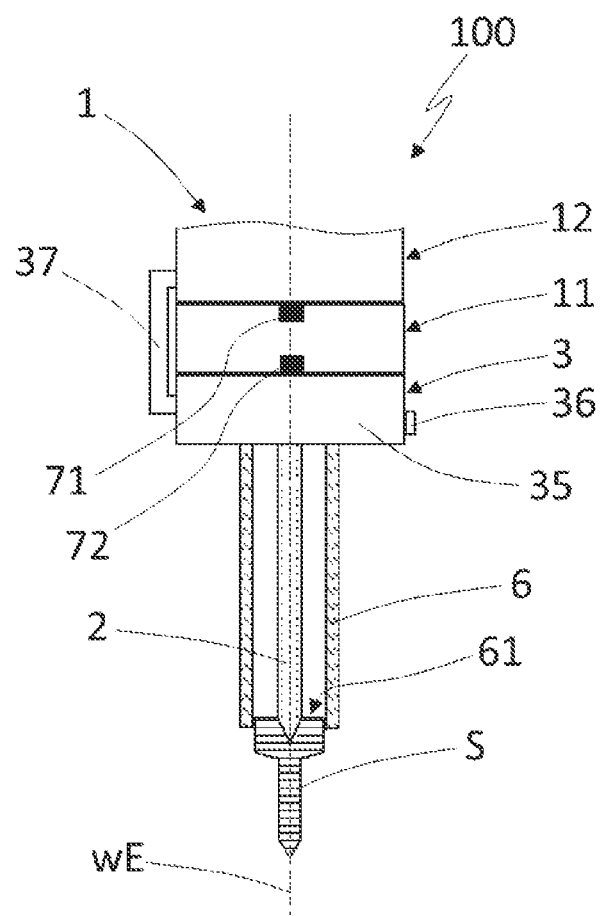
FIG. 2 is a partial cross-section view of a first sample embodiment of the inventive device.
Figure 3:
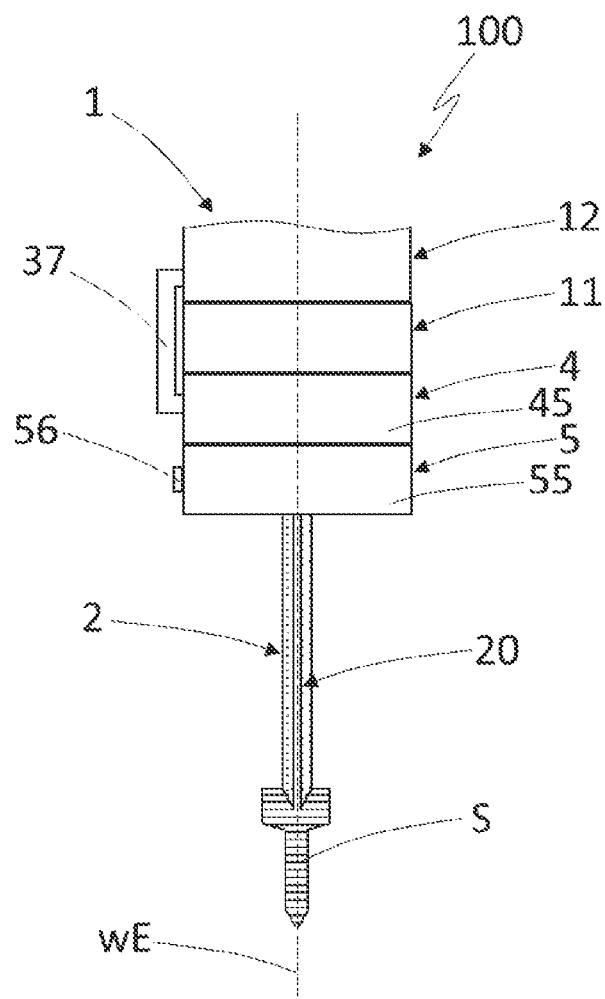
FIG. 3 is a partial cross-section view of a second sample embodiment.

FIGS. 2 and 3 show schematic partial views of various sample embodiment of the inventive device 100, where of the associated articulated robot only the end link 12 and the output element 11 on the same that can be rotated around the effector axis wE are shown in each case. Screwdriver tool 2, screw S and the suction pipe 6 are each shown in cross-section.

FIG. 2 shows a first sample embodiment of an inventive device 100 with a planetary gear 3 which has a direct operative connection to the output element 11 and the screwdriver tool 2 and is set up for transmission of a rotary seed between the output element 11 and the screwdriver tool 2. The housing 35 of the planetary gear 3 is connected in a torque-proof manner and rigidly to the end link 12 by means of the retaining device 37. This means that the housing 35 is not included in the rotation of the output element 11. In the drive and output links of the planetary gear 3 hidden inside the housing 35 are connected in a torque-proof manner to the output element 11 or, as the case may be, the screwdriver tool 2.

The housing 35 is designed to be essentially airtight and so that negative pressure can be applied to it via the suction connection 36. The torque-proof connection of the planetary gear 3 with the output element 11 is designed to be airtight in a manner that is not shown, such as by means of a sealing ring on the housing 35. The suction pipe 6 is accommodated on the housing 35 and negative pressure can be applied to it via the interior of the housing 35 by means of the suction connection 36. The screwdriver tool 2 connected in a torque-proof manner to the output link of the planetary gear 3 extends axially inside the suction pipe 6 along the effector axis wE. The screw S engaged by the screwdriver tool 2 is dimensioned such that the diameter of its head matches the inner diameter of the suction pipe 6 such that the screw makes contact to the wall of the suction pipe 6 in the area of the opening 61 in an essentially airtight manner and due to the negative pressure prevailing in the suction pipe 6 is subject to a pronounced holding effect.

The torque sensor 71 and the force sensor 72 act to further monitor the screwing process with the device 100; as an example, these are integrated here into the output element 11 of the articulated robot 1.

FIG. 3 shows a second sample embodiment of an inventive device 100 with a plurality of planetary gears 4 and 5 arranged in series, where the drive link of the first planetary gear 4 is connected in a torque-proof manner to the output element 11 of the articulated robot 1 and where the output link of the last planetary gear 5 is connected in a torque-proof manner to the screwdriver tool 2. In this respect, the two planetary gears 4 and 5 each comprise a ring gear, a sun gear and a planetary carrier with planetary wheels in accordance with FIG. 1, where the ring gears are directly connected in a torque-proof manner to the end link 12 and where the output link of the first planetary gear 4 is formed by its planetary carrier and the output link of the last planetary gear 5 by its sun gear.

The first planetary gear 4 is accommodated rigidly on the end link 12 of the articulated robot 1 via the housing 45 by means of the retaining device 37 and the housing 45 and 55 of the two planetary gears 4 and 5 are likewise connected in a torque-proof manner to each other such that neither of the housings 45 and 55 are included in a rotation of the output element 11. The series arrangement of the two planetary gears 4 and 5 facilitates a two-stage and thus an especially small transmission ratio of the rotary speed between the output element 11 and the screwdriver tool 2, which makes it possible to realize extremely high rotary speeds at the screwdriver tool 2. It would also be conceivable to use an even larger number of planetary gears arranged in series.

At least the housing 55 of the last planetary gear 5 is designed to be essentially airtight and can be subjected to negative pressure via the suction connection 56. The screwdriver tool 2 connected in a torque-proof manner to the last planetary gear 5 (not shown here) features the suction channel 20 extending axially along the full length, to which negative pressure can be applied via the interior of the housing 55. This embodiment gives rise to a suction-based holding effect on the screw head drive of screw S that is engaged with the screwdriver tool 2.

Figure 4:
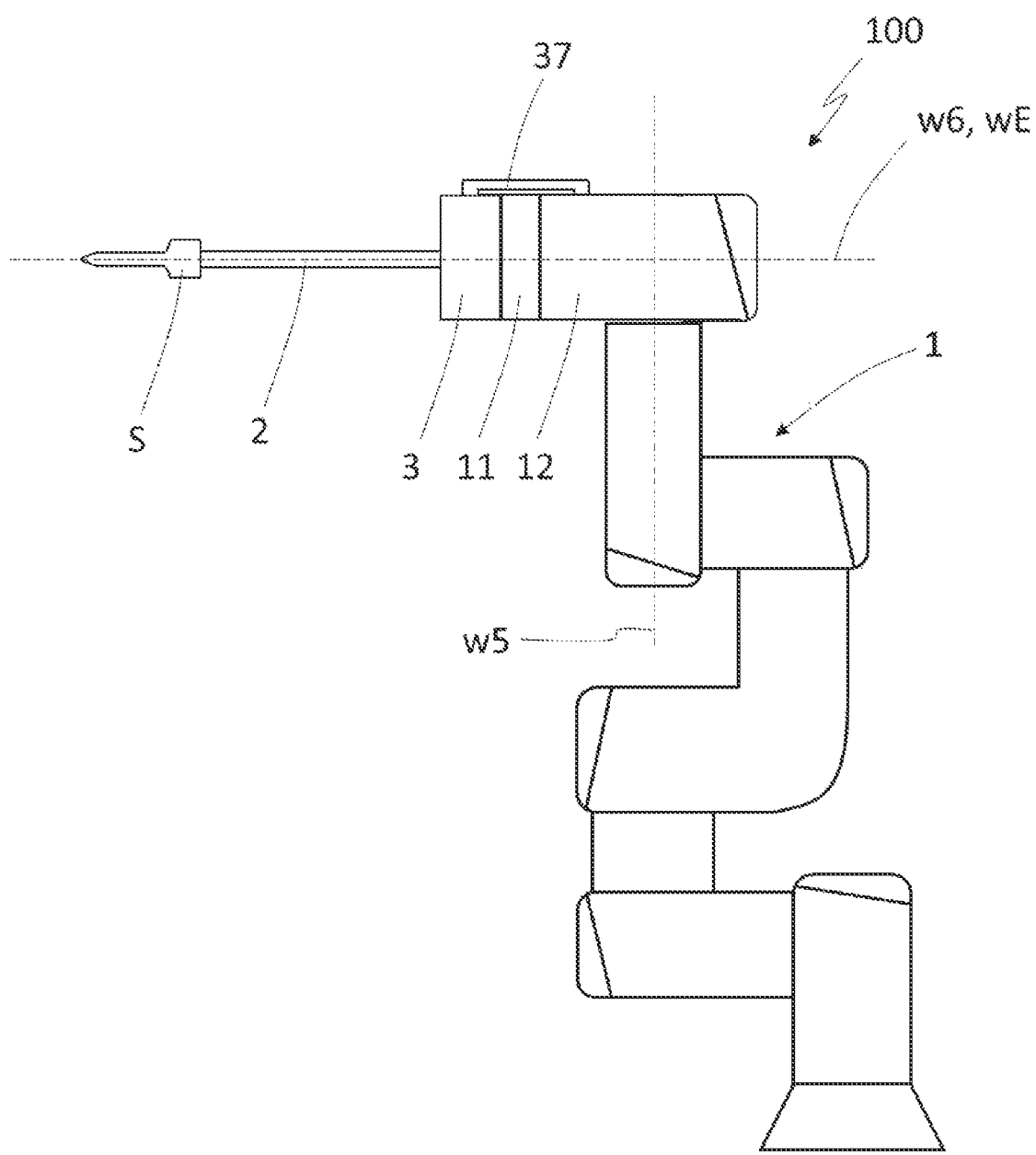
FIG. 4 is a view of a sample embodiment with 6-axis articulated robot.

FIG. 4 shows a schematic overview of an inventive device 100 with an articulated robot 1 featuring six rotary axes, where the effector axis wE is formed by the sixth rotary axis w6 and where the end link 12 can be rotated around the fifth rotary axis w5. The planetary gear 3 is accommodated at the end link 12 by means of the retaining device 37 has a direct operative connection with the drive element 11 and the screwdriver tool 2 for transmission of the rotary speed. The inventive 100 exploits the torque at the output element 11 of the articulated robot 1 to perform an efficient process working with a high rotary speed at the screwdriver tool 2 for the automated production of a screw connection with screw S.

The design of the invention is not limited to the preferred sample embodiment specified above. Rather, a number of variants are conceivable, which make use of the present solution even in designs of a fundamentally different type. All of the features and/or advantages arising from the Claims, the description or the drawings, including design details and physical layouts, may be vital to the invention both by themselves and in a wide variety of combinations.

LIST OF REFERENCE NUMBERS

100 Device
1 Articulated robot
11 Output element
12 End link
2 Screwdriver tool
20 Suction channel
3, 4, 5 Planetary gear
3a Drive link
3b Output link
31 Ring gear
32 Sun gear
33 Planetary carrier
34 Planetary wheel
35, 45, 55 Housing
36, 56 Suction connection
37 Retaining device
6 Suction pipe
61 Opening
71 Torque sensor
72 Force sensor
wE Effector axis
w5 Fifth axis of rotation
w6 Sixth axis of rotation
S Screw

We claim:

1. A device for the automated production of screw connections, the device comprising:
   an articulated robot with an output element and an end link, wherein the output element is arranged on the end link rotatable around an effector axis (wE);
   a screwdriver tool rotatable around the effector axis (wE) by the output element; and
   a planetary gear having a drive link connected to the output element and the screwdriver tool in a driving manner, the planetary gear transmitting a rotational speed between the output element and the screwdriver tool, the planetary gear further comprising:
      a ring gear connected to the end link such that the ring gear and the end link are restricted from rotating relative to each other;
      a sun gear; and
      a planetary carrier with planetary gears,
   wherein the drive link is formed by the planetary carrier and the output link is formed by the sun gear.

2. The device in accordance with claim 1, wherein the planetary gear features an airtight housing with a suction connection, and wherein the housing is connected to the end link such that the housing and the end link are restricted from rotating relative to each other.

3. The device in accordance with claim 2, further including a suction pipe, which is accommodated on the housing in such a way that negative pressure is applied to the housing and the suction pipe via the suction connection, wherein the screwdriver tool extends axially in the suction pipe, and wherein the suction pipe features an opening for airtight application of a screw(S).

4. The device in accordance with claim 2, wherein a suction channel extends axially all the way through the screwdriver tool, where the screwdriver tool is accommodated on the planetary gear in such a way that negative pressure can be applied to the housing and the suction channel via the suction connection, such that a screw(S) engages with and is held by the screwdriver tool by the negative pressure.

5. The device in accordance with claim 1, wherein the articulated robot includes six rotary axes, wherein the effector axis (wE) is formed by a sixth rotary axis, and wherein the end link can be rotated around a fifth rotary axis.

6. The device in accordance with claim 1, further including a torque sensor or force sensor interacting with the screwdriver tool.

7. A device for the automated production of screw connections, the device comprising:
an articulated robot with an output element and an end link, wherein the output element is arranged on the end link rotatable around an effector axis (wE);
a screwdriver tool rotatable around the effector axis (wE) by the output element; and
a plurality of planetary gears arranged in series, each planetary gear including:
a ring gear connected to the end link such that the ring gear and the end link are restricted from rotating relative to each other;
a sun gear; and
a planetary carrier with planetary gears,
wherein a drive link of a first planetary gear is connected to the output element such that the drive link of the first planetary gear and the output element are restricted from rotating relative to each other, the drive link of the first planetary gear formed by the planetary carrier of the first planetary gear, and
wherein an output link of a last planetary gear is connected to the screwdriver tool such that the output link of the last planetary gear and the screwdriver tool are restricted from rotating relative to each other, the output link of the last planetary gear formed by the sun gear of the last planetary gear.

* * * * *